United States Patent [19]

Astberg

[11] E Patent Number: Re. 32,568

[45] Reissued Date of Patent: Dec. 29, 1987

[54] SCREW ROTOR MACHINE AND ROTOR PROFILE THEREFOR

[75] Inventor: Åke Astberg, Nacka, Sweden

[73] Assignee: Svenska Rotor Maskiner Aktiebolag, Nacka, Sweden

[21] Appl. No.: 834,219

[22] Filed: Feb. 25, 1986

Related U.S. Patent Documents

Reissue of:

[64] Patent No.: 4,435,139
Issued: Mar. 6, 1984
Appl. No.: 345,230
Filed: Feb. 3, 1982

[30] Foreign Application Priority Data

Feb. 6, 1981 [GB] United Kingdom ..... 8103739

[51] Int. Cl.[4] ..... F04C 18/16
[52] U.S. Cl. ..... 418/201
[58] Field of Search ..... 418/150, 201

[56] References Cited

U.S. PATENT DOCUMENTS

| | | | |
|---|---|---|---|
| 3,314,598 | 4/1967 | Lysholm | 418/201 |
| 4,028,026 | 6/1977 | Menssen | 418/201 |
| 4,053,263 | 10/1977 | Ingalls | 418/201 |
| 4,088,427 | 5/1978 | Emanuelsson et al. | 418/204 |
| 4,140,445 | 2/1979 | Schibbye | 418/201 |
| 4,350,480 | 9/1982 | Bammert | 418/201 |
| 4,460,322 | 7/1984 | Schibbye et al. | 418/201 |
| 4,527,967 | 7/1985 | Ingalls | 418/201 |

FOREIGN PATENT DOCUMENTS

| | | |
|---|---|---|
| 1197432 | 7/1970 | United Kingdom . |
| 1358505 | 7/1974 | United Kingdom . |
| 1503488 | 3/1978 | United Kingdom . |

*Primary Examiner*—Carlton R. Croyle
*Assistant Examiner*—Jane E. Obee
*Attorney, Agent, or Firm*—Frishauf, Holtz, Goodman & Woodward

[57] ABSTRACT

Screw rotor compressor comprising intermeshing male and female rotors. The leading flank of each male rotor groove comprises a portion intersecting with the pitch circle and following a circular arc having its center inside the pitch circle. In the point of intersection, the tangent to the arc forms an angle of 0.25 rad to 0.75 rad with a radius of the rotor, and the radius of the arc forms an acute angle with a line connecting the center of the arc with the center of the rotor.

61 Claims, 7 Drawing Figures

SCREW ROTOR MACHINE AND ROTOR PROFILE THEREFOR

Matter enclosed in heavy brackets [ ] appears in the original patent but forms no part of this reissue specification; matter printed in italics indicates the additions made by reissue.

BACKGROUND OF THE INVENTION

The present invention relates to a screw rotor machine for a working fluid and to the profiles of the rotors therefor. The invention is especially related to such a machine for selective compression and expansion of an elastic working fluid.

A screw rotor machine of the above type for an elastic working fluid comprises a casing with a working space provided with spaced apart low pressure and high pressure ports for communication with low pressure and high pressure channels, respectively, and generally composed of at least two intersecting bores with parallel axes, and a number of rotors intermeshing in pairs, disposed in said bores, each rotor having a helical lands and intervening grooves with a warp angle of less than 360°. A pair of communicating groove portions of intermeshing rotors form a chevron-shaped chamber having its base end disposed in a fixed plane transverse to the rotor axes, and adjacent to the high pressure port, whereas its apex moves axially as the rotors revolve to vary the volume of the chamber. One rotor of each pair is of female rotor type, i.e., a rotor having at least the major portions of its lands and grooves disposed inside the pitch circle of the rotor. The other rotor of the pair is of male rotor type, i.e. a rotor having at least the major portions of its lands and grooves disposed outside the pitch circle of the rotor. The lands of one rotor following the envelopes developed by the grooves of the other rotor to form a continuous sealing line between the rotors.

The efficiency of such machines depends to a large extent upon the profile of the rotors and desirably, the profile is such that each rotor groove is asymmetric about the radial line drawn from the centre of the rotor through the midmost point of the bottom of the groove and provided with a primary and a secondary flank. The primary flank is the trailing flank of the female rotor groove and the leading flank of the male rotor groove, respectively, when the machine acts as a compressor, and the reverse thereto when the machine acts as an expander, which means that the primary flank forms the peripherally outer wall of the leg of the chevron-shaped chamber composed of a female rotor groove and the peripherally inner wall of the leg of the chamber composed of a male rotor groove, respectively, and the secondary flank forms the other wall of the related leg of the chamber.

One such asymmetric rotor profile is disclosed in British Pat. No. 1,197,432 (based upon British patent application No. 34217/66), especially in FIGS. 6 and 7 thereof. In a plane perpendicular to the rotor axes the primary flank of each female rotor groove comprises a substantial concave portion following an epitrochoidal curve generally generated by a point near the radially outer end of the cooperating primary male rotor flank, a minor portion of the substantial portion extending out to the pitch circle and following a straight radial line, and a convex addendum portion following a circular arc having its centre adjacent to the pitch circle. The cooperating primary flank of a male rotor comprises correspondingly a substantial convex portion following an epitrochoidal curve generally generated by the innermost point of the minor portion of the primary flank of the female rotor groove, a minor convex portion extending to the pitch circle and following a curve being the envelope developed by the straight line defining the minor portion of the primary female rotor groove flank, and a concave dedendum portion generally following a circular arc and having its centre adjacent to the pitch circle. The secondary flank of the groove of the female rotor comprises a substantial concave portion out to the pitch circle and following a circular arc having its centre outside the pitch circle and having a tangent in its point of intersection with the pitch circle which tangent follows a radial line passing throught the centre of the rotor, and a convex addendum portion similar to that of the primary flank of the groove. The cooperating secondary flank of the male rotor comprises a convex substantial portion following the envelope developed by the circular arc defining the substantial portion of the secondary female rotor groove flank consequently having a radial tangent on the pitch circle and a concave dedendum portion similar to that of the primary flank of the land.

It has been found that the rotor profile so described is not ideal in all respects but impaired with drawbacks with regard to the portions of the male rotor flanks disposed adjacent to the pitch circle of the rotor. These drawbacks relate especially to the manufacture of the rotor and depend upon the angles of the flanks. Thus the angle between the two flanks of a male rotor groove at the pitch circle is so small that the angle between the axes of the rotor and of a cutter for its production is pratically fixed and necessitates substantially parallel edges of the cutting tool at the outer portion thereof. This means that it is practically impossible to produce the theoretical profile by a hob milling process.

Futhermore the variation along the flank of the angle between the tangent to the flank and a radius through the point of tangency as a function of the distance from the pitch circle is of generally hyperbolic type which means that it is substantially constant over the main portion of each flank but increases rapidly within the region thereof adjacent to the pitch circle. For this reason also, the milling cutter will get a fast variation of its angle at its outer end, i.e. a short radius of curvature, and consequently the cutting angels in the most important region of the rotor flanks will be unfavourable resulting in the necessity of relatively wide tolerances within this region. Further, the actual shape of the cutter induces a high wear thereof and thus a considerable amount of tool material has to be ground away during each resharpening operation. Consequently the number of required resharpenings is high and, since the number of possible resharpenings is limited, the cost of the tools is a real financial consideration which cannot be disregarded in the final cost of producing rotors. Still another drawback is that the radius of curvature of the flank decreases down to a zero value at the pitch circle. Such a curvature is very difficult to achieve which results in a poor and rough surface. However, even if a smooth surface is produced correctly, the short radius of curvature means that the surface will be exposed to very high surface stresses.

A modification of the rotor profile discussed above is disclosed in British Pat. No. 1,503,488 (based upon British patent application No. 10070/74). In this modified rotor profile, a section of the secondary flank of a female rotor groove disposed inside and adjacent to the pitch circle of the rotor follows in a plane perpendicular to the rotor axes a straight line forming a tangent to the circular arc defining the substantial portion of said second flank of the earlier discussed profile, and further forming an angle of 20° with a radial line drawn from the centre of the rotor to the point of intersection between said flank section and the pitch circle of the rotor. The cooperating secondary flank of a male rotor is provided with a corresponding section disposed outside and adjacent to the pitch circle of this rotor and following the envelope developed by the straight line flank section of the female rotor. In this way the angle between the two flanks of a male rotor groove within the region adjacent to the pitch circle is increased up to a value allowing hob milling manufacture simultaneously as the radius of curvature of the secondary male land flank in its point of intersection with the pitch circle obtains a certain length which, however, is only about 60% of the product of the pitch radius and the sine function of said 20° angle whereas the radius of curvature on the primary flank side still is zero. The variation along the flank of the angle between the tangent and the radius as a function of the distance from the pitch circle is still of hyperbolic type which means a rapid increase thereof adjacent to the pitch circle, even if this increase is not so accentuated as when the angle at the pitch circle goes down to a zero value. The drawbacks of the unmodified profile discussed above are thus in part eliminated, however, without resulting in ideal conditions. Furthermore, the lands of the female rotor will in this way be weakened which may cause problems during manufacture of the rotor as well as during operation of the machine owing to a certain bending of the lands.

The rotor profile shown in British Pat. No. 1,503,488 is further modified in relation to that shown in British Pat. No. 1,197,432 in that the dedendum portion of the primary flank of each male rotor adjacent to the pitch circle is provided with a section following a straight line directed radially towards the centre of the rotor and in that the addendum portion of the primary flank of each female rotor groove is provided with a corresponding section disposed adjacent to the pitch circle of the rotor and following the envelope developed by said flank section of the primary male rotor flank. Those sections of the primary flanks of the male and female rotors, respectively, are intended for an improvement of so called female rotor drive, i.e. the female rotor is connected to a prime mover and the male rotor is driven by direct flank contact between the rotors, which is intended especially for small compressors in order to increase the number or revolutions of the male rotor and thus the tip speed of the rotors without any need of a step-up gear. The location of those flank sections inside the pitch circle of the male rotor and outside the pitch circle of the female rotor, respectively, is intended to provide meshing conditions between those flank sections favourable for achieving a lubricating liquid film therebetween. However, the section of the primary flank of the female rotor groove will in its point of intersection with the pitch circle have a radial tangent, and a length of its radius of curvature having a zero value, similar to the conditions for the male rotor land flanks discussed above in relation to the unmodified profile. For this reason the section of the primary female rotor groove flank is impaired by drawbacks of about the same type as those discussed above with regard to the male rotor land flanks. Furthermore, the straight radial section of the primary male rotor land flank will further complicate the cutting of the rotor. Owing to those disadvantages a rotor profile as shown in British Pat. No. 1,503,488 is not suitable for practical use.

A further modification of the rotor profile shown in British Pat. No. 1,197,432 is shown in U.S. Pat. No 4,053,263, where each flank of the male and female rotors adjacent to the related pitch circle is provided with a convex flank portion following a curve of involute type having a pressure angle of 20°. This involute flank portion of the primary flank of each male rotor land extends from a point slightly inside the pitch circle to a point substantially at the outside diameter circle. The involute flank portion of each secondary flank of the male rotor extends from a point slightly inside the pitch circle to a point located a substantial distance outside the pitch circle. The involute flank portion of each flank of the female rotor extends between a point disposed slightly outside the base circle of the involute curve to a point slightly outside the pitch circle. In this way the angle between the two flanks of a male rotor groove is increased at the pitch circle simultaneously as the radii of curvature in the points of intersection between the flanks and the pitch circle gets a certain value, being the product of the pitch radius and the sine function of the pressure angle. However, the angle between the flanks of the male rotor descreases rapidly when moving inwardly from the pitch circle simultaneously as the variation of the angle between the tangent and the radius still is generally hyperbolic type which means a rapid increase thereof adjacent to the pitch circle and in to the base circle of the involute. Furthermore the radii of curvature of the flanks also decrease rapidly within the radially innermost portions thereof. Eventhough this modified profile in spite of the relatively short radius of curvature of the male rotor flanks at the pitch circle may be acceptable for production of rotors where the directly contacting surfaces of the rotor flanks are disposed outside the pitch circle of the male rotor and inside the pitch circle of the female rotor, respectively, it does not allow more than a very small extension of those contacting surfaces beyond the related pitch circle. The modified rotor profile shown in U.S. Pat. No. 4,053,263 is consequently not suitable for production of rotors where the contacting surfaces of the male rotor lands extend inside the pitch circle which is especially essential for female rotor drive.

Still another modification of the rotor profile shown in British Pat. No. 1,197,432 is shown in British Pat. No. 1,358,505 where each female rotor groove flank inside of and adjacent to the pitch circle is provided with a convex flank section following a circular arc. The length of the radius of said arc is of the order of 20% to 40% of the centre distance of the rotors and the centre of said arc is disposed outside the pitch circle of the female rotor, which means that the cooperating flank section of the male rotor land in its point of intersection with the pitch circle has a tangent forming an angle of only about 5° with a radial line drawn from the centre of the rotor through said point of intersection, and further that the radius of curvature of the flank section in said point is very small and amounts to only 60% to 70% of the product of the pitch radius and the sine function of said 5° angle. The variation of the angle between the tangent and the radius is also in this modified profile of hyperbolic type and reaches a high value at the pitch circle. The advantages of this profile compared with that of British Pat. No. 1,197,432 are thus negligible.

A first main object of the present invention is to achieve a screw rotor machine of the type specified which may be manufactured more accurately and at a lower cost, simultaneously as the efficiency of the machine is improved, compared with earlier produced machines.

A second object is to achieve a screw rotor machine which may be adopted not only for male rotor drive but also for female rotor drive with at least the same efficiency and mechanical reliability.

A third object is to achieve a rotor profile where each female rotor land has such a shape that its peripheral width increases continuously from its radially outermost to its radially innermost end thereby increasing the stiffness thereof with regard to bending forces.

A fourth object is to achieve a continuous movement of the sealing point along each rotor flank from one end thereof to the other as the rotors revolve.

SUMMARY OF THE INVENTION

The main object of the invention is met by modifying the rotor profile shown in British Pat. No. 1,197,432 at least with regard to the portion of the primary flank of each male rotor groove within the region adjacent to the pitch circle. In a plane perpendicular to the rotor axis the pitch point angle, i.e. the angle between the tangent to the flank in its point of intersection with the pitch circle and the radial line from the centre of the rotor through this point, falls within the range of 0.25 rad to 0.75 rad simultaneously as the radius of curvature of the flank in this point has a length exceeding the product of the pitch radius of the rotor and the sine function of the pitch point angle. *Preferably the flank is composed of a first portion, the radial extremes of which lie within the range 0.9 to 1.15 times the pitch radius, and a second portion adjacent to and extending radially outwardly from the first portion, where at the common point the radius of curvature of the second portion to avoid seizing is of at least the same length as that of the first portion.* Furthermore the flank within the region thereof adjacent the pitch circle has such a shape that the ratio between the angular deviation from the pitch point angle of the angle between the tangent to the flank in an arbitrary point thereof and radial line from the centre of the rotor through this point, and the radial distance from the point to the pitch circle is substantially constant and about equal to the average value of such a ratio taken over the major portion of the flank remote from the pitch circle. In this way the manufacture of the rotor is simplified independent of the production method. Special advantages are obtained when cutting or grinding processes are used as the angle between the axes of the tool and of the workpiece can be selected for optimum working conditions. In combination with the increased radius of curvature of the actual flank portion this results in closer tolerances, a smoother flank surface, less wear of the tool, a higher number of rotors between resharpenings of the tool, and a possibility to use a higher cutting speed. The tool will further get a shape where the two flanks thereof always form a considerable angle therebetween which means a simpler production thereof and especially that the amount of material to be cut away in each resharpening operation is reduced to a minimum, so that the number of resharpenings will get a maximum value. In other words the quality of the rotors will be improved simultaneously as the cost of the production is reduced. Furthermore owing to the increased radius of curvature of the flank adjacent to the pitch circle the surface stresses of the flank will be considerably reduced. In combination with the fact that the new flank profile gives a lower relative sliding speed between the rotor flanks within the actual region thereof the wear of the rotors during operation is reduced which means a still higher mechanical reliability as well as less frictional losses. In combination with the narrower clearances owing to the improved quality of the rotors this also means a considerable improvement of the over all efficiency of the machine.

The second object of the invention is met by providing the primary male rotor flank with a portion extending on both sides of the pitch circle and having a generally constant radius of curvature. In this way an easily manufactured contact surface can be obtained inside the pitch circle having a considerable radius of curvature and a favourable tangent angle of the same type as discussed above with regard to the main object of the invention.

The third object of the invention is met by providing also the secondary male rotor flank with a portion with a generally constant radius of curvature, extending outwardly from the pitch circle and having a pitch point tangent forming an angle of at least 20° with a radial line through the pitch point. The secondary female rotor flank generated thereby will then get an S-shaped configuration resulting in continuous increase of the peripheral width of the female rotor land from its radially outermost to its radially innermost end.

The fourth object of the invention is met by replacing the sharp corners of the primary rotor flanks of the profile shown in British Pat. No. 1,197,432 by short arc portions. In this way the flank profile will follow a continuous curve which can be manufactured more accurately and with less risk for damages of the completed rotor, simultaneously as the sealing point moves continuously along all flank portions, resulting in a better sealing action and in a considerable reduction of the leakage area owing to a local defect of the sealing arc-shaped portion compared with the leakage area owing to a similar defect of a sharp corner of the earlier rotor profile.

The invention will now be described more in detail in connection with the embodiment of a compressor which is shown in the accompanying drawings.

DETAILED DESCRIPTION

Figure 1:
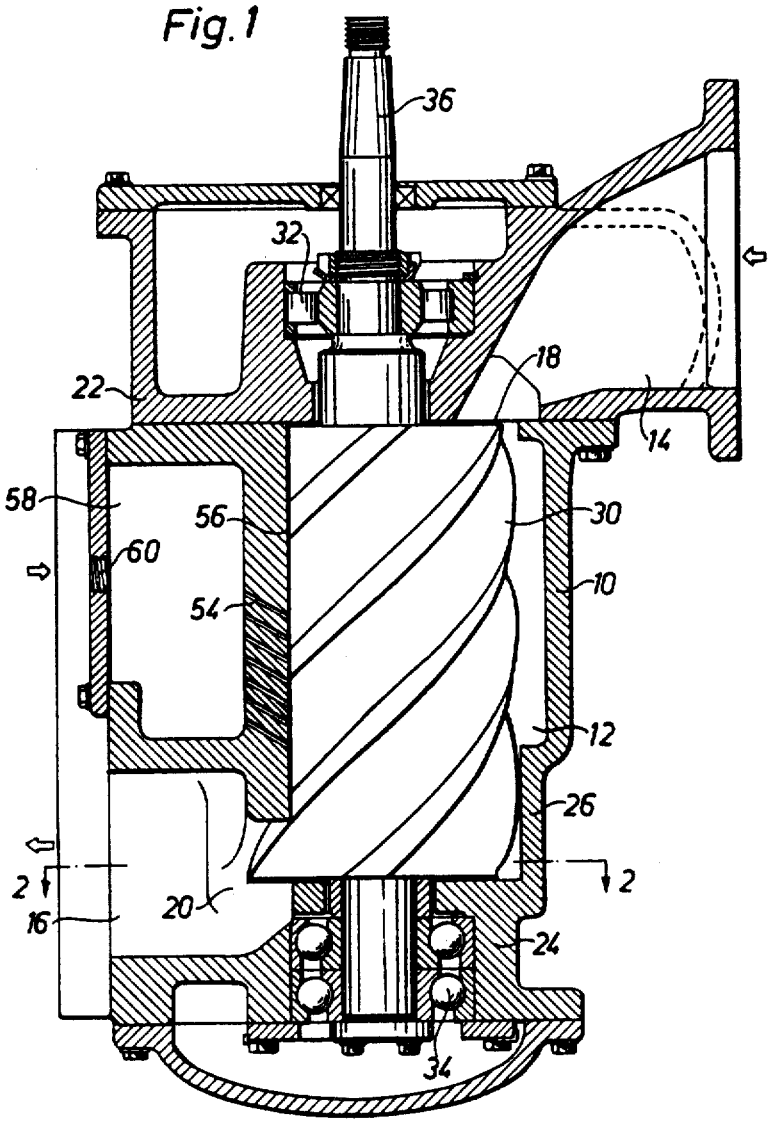
FIG. 1 shows a vertical section through a screw compressor taken on line 1—1 in FIG. 2.
Figure 2:
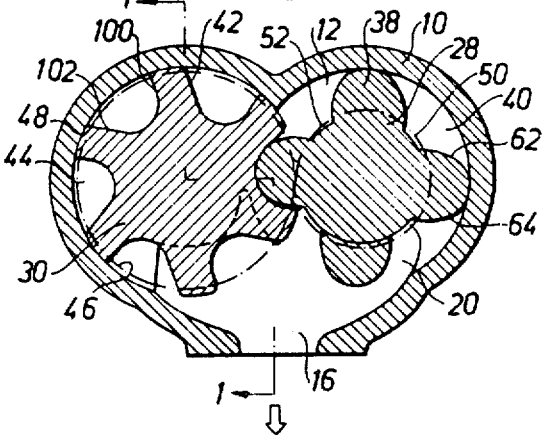
FIG. 2 shows a transverse section through the compressor of FIG. 1 taken on line 2—2 in FIG. 1.
Figure 3:
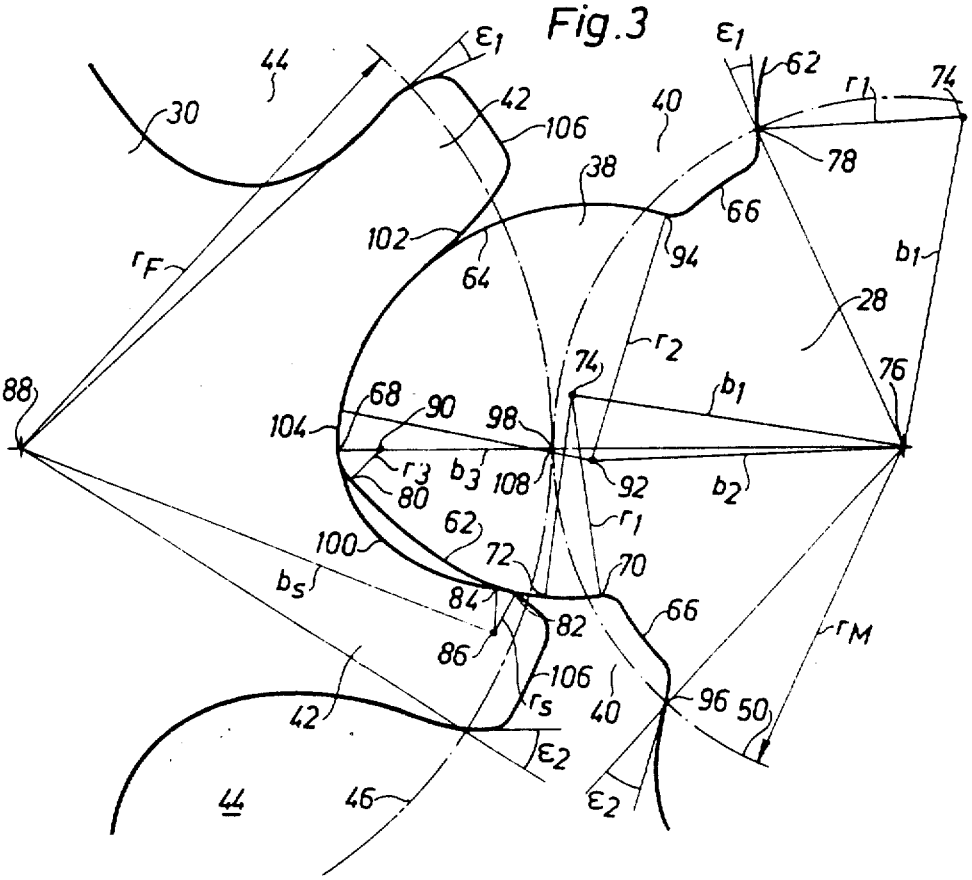
FIG. 3 shows a detail of FIG. 2 on a larger scale.

The screw compressor shown in FIGS. 1 to 3 comprises a casing 10 forming a working space 12 substantially in the form of two intersecting cylindrical bores having parallel axes. The casing 10 is further provided with a low pressure channel 14 and a high pressure channel 16 for the working fluid which channels communicate with the working space 12 through a low pressure port 18 and a high pressure port 20, respectively.

In the compressor shown the low pressure port 18 is located in its entirety in the low pressure end wall 22 of the working space 12 and extends mainly on one side of the plane containing the axes of the bores. The high pressure port 20 of the compressor shown is located partly in the high pressure end wall 24 of the working space 12 and partly in its barrel wall 26 and it is in its entirety located on the side of the plane through the axes of the bores opposite to the low pressure port 18.

In the working space 12 are provided two cooperating rotors, viz, a male rotor 28 and a female rotor 30, located with their axes coinciding with the axes of the bores. These rotors are journaled in the casing 10 in cylindrical roller bearings 32 in the low pressure end wall and in pairs of ball bearings 34 with shoulders in the high pressure end wall 24. The female rotor 30 is further provided with a stub shaft 36 projecting outside the casing 10.

The male rotor 28 has four helical lands 38 and intervening grooves 40 having a wrap angle of about 300°. The female rotor 30 has six helical lands 42 and intervening grooves 44 having a wrap angle of about 200°. The female rotor lands 42 are provided with addendums 48 located radially outside the pitch circle 46 of the female rotor 30 and the male rotor grooves 40 are provided with corresponding dedendums 52 located radially inside the pitch circle 50 of the male rotor 28.

In the barrel wall 26 of the working space 12 are provided a plurality of oil injection channels 54 opening at the intersection line 56 between the two bores forming the working space 12. These channels 54 form communications between an oil supply chamber 58 and the working space 12. Oil is supplied to this chamber from a pressure oil source not shown through a supply opening 60 under a pressure higher than the pressure prevailing in the working space 12 at the openings of the channels 54.

As shown in FIGS. 2 and 3, each male rotor groove 40 comprises a primary flank 62, being the leading flank of the groove when disposed in a compressor and the trailing flank thereof when disposed in an expander, and a secondary flank 64, being the trailing flank or the leading one, respectively. Each of said flanks 62, 64 extends from a radially innermost bottom portion 66 of the groove 40 out to the crest portion 68 of the adjacent land 38.

The primary flank 62 is composed of three consecutive portions. The first portion 70–72 of the flank 62 follows a circular arc having a radius $r_1$ and its centre 74 disposed on a distance $b_1$ from the centre 76 of the rotor 28 and extend from a point 70 inside the pitch circle 50 disposed on a distance from the centre 76 of the rotor of about 95% of the pitch radius $r_M$ of the rotor (*but could be as low as about 90% of the pitch radius $r_M$ of the rotor*) to a point 72 outside the pitch circle 50 disposed on a distance from the rotor centre 76 of about 110% of the pitch radius $r_M$. (*but could be as high as about 115% of the pitch radius $r_M$*) The portion 70–72 intersects with the pitch circle 50 in a point 78 and has in this point a tangent which forms an angle $\epsilon_1$ with a radial line 76–78. The angle $\epsilon_1$ is 20° or about 0.3 rad. The length of the radius $r_1$ is about 1.6 times the product of the pitch radius $r_M$ and sine $\epsilon_1$. The distance $b_1$ is somewhat larger than the product of the pitch radius $r_M$ and cosine $\epsilon_1$. The second portion 72–80 of the flank 62 follows a generally epitrochoidal curve, generated by a section 82–84 of the cooperating primary flank 100 of the female rotor groove 44, and extends from the point 72 where it has a tangent common to that of the first flank portion 70–72 to a point 80 dispoed close to the crest portion 68 of the land 38. The flank section 82–84 follows a circular arc having a radius $r_s$ and its center 86 disposed on a distance $b_s$ from the centre 88 of the female rotor 30. The length of the radius $r_s$ is about 5% of the distance between the centres 76, 88 of the rotors. The distance $b_s$ is about equal to the product of the pitch radius $r_F$ of the female rotor 30 and $\sqrt{\text{cosine } \epsilon_1}$. The radius of curvature of the generally epitrochoidal curve defining the second flank portion 72–80 decreases continuously from the outer point 80 to the inner point 72 where it has a functional minimum equal to the radius $r_1$. The third portion 80–68 of the flank 62 follows a circular arc having a radius $r_3$ and its centre 90 disposed on a distance $b_3$ from the centre 76 of the rotor 28 and extends from the point 80 where it has a tangent common to that of the second flank portion 72–80 to the crest portion 68. The length of the radius $r_3$ is about 5% of the distance between the centres 76, 88 of the rotors. The distance $b_3$ is about equal to the difference between the outer radius of the rotor 28 and the radius $r_3$.

The secondary flank 64 follows a circular arc having a radius $r_2$ and its centre 92 disposed on a distance $b_2$ from the centre 76 of the rotor and extends from a point 94 inside the pitch radius 50 disposed on a distance from the centre 76 of th rotor of about 95% of the pitch radius $r_M$ of the rotor to the crest portion 68. The secondary flank 64 intersects with the pitch circle 50 in a point 96 and has in this point a tangent which forms an angle $\epsilon_2$ with a radial line 76–96. The angle $\epsilon_2$ is 30° or about 0.5 rad. The length of the radius $r_2$ is about 1.4 times the product of the pitch radius $r_M$ and sine $\epsilon_2$. The distance $b_2$ is somewhat larger than the product of the pitch radius $r_M$ and cosine $\epsilon_2$.

The bottom portion 66 is composed of a major, convex section cylindrical around the centre 76 of the rotor and two minor, concave sections for smooth connections with the primary and secondary flanks of the rotor 28 in the points 70 and 94, respectively.

The crest portion 68 follows a convex circular arc having its centre 98 on the pitch circle 50 for smooth connections with the primary and secondary flanks of the rotor 28.

Each female rotor groove 44 comprises a primary flank 100, being the trailing flank of the groove when disposed in a compressor and the leading flank thereof when disposed in an expander, and a secondary flank 102, being the leading flank or the trailing one respectively. Each of said flanks 100, 102 extends from a radially innermost bottom portion 104 of the groove 44 out to the crest portion 106 of the adjacent land 42.

The primary flank 100 is composed of three consecutive portions. The first portion extending from the crest portion 106 to the point 82 follows a curve generated by the first flank portion 70–72 of the cooperating primary flank 62 of the male rotor 28. The second portion is the flank section 82–84 described above in connection with the second portion 72–80 of the primary flank 62 of the male rotor. It has to be noted that this section 82–84 can be decreased down to zero length whereby, however, this section will be replaced by an obtuse corner. The third portion extending from the point 84 to the bottom portion 104 follows a curve generated by the third portion 80–68 of the cooperating primary flask 62 of the male rotor 28.

The secondary flank 102 of the female rotor groove 44 follows a convex-concave curve having a point of inflection generated by the cooperating, secondary flank 64 of the male rotor.

The crest portion 106 of the female rotor 30 is composed of a major, convex portion cylindrical around the centre 88 of the rotor and two minor, convex sections for smooth connection with the primary and secondary flanks of the rotor.

The bottom portion 104 of the female rotor 30 follows a concave, circular arc having its centre 108 on the pitch circle 46 for smooth connection with the primary and secondary flanks of the rotor 30.

It is to be noted that it is also possible to shape the crest portion 68 of the male rotor 28 and the bottom portion 104 of the female rotor 30 as convex portions cylindrical around the related centre 76, 88 of the rotor. It is also possible to replace the minor convex sections of the female rotor crest 106 and the third portion 80–68 of the primary flank 62 of the male rotor 28 by obtuse corners.

Figure 4:
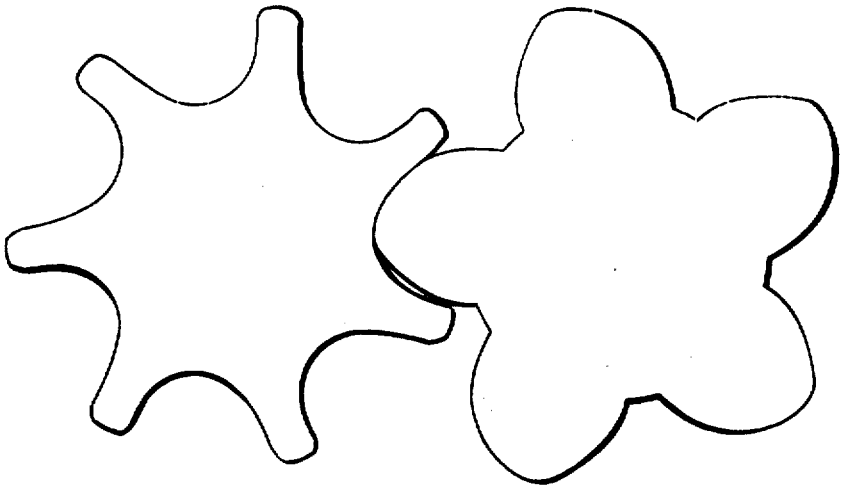
FIG. 4 shows another rotor profile according to the invention.

FIG. 4 shows a rotor profile of the same general type designed for a combination of a male rotor having five lands and grooves and a female rotor having seven lands and grooves.

Figure 5:
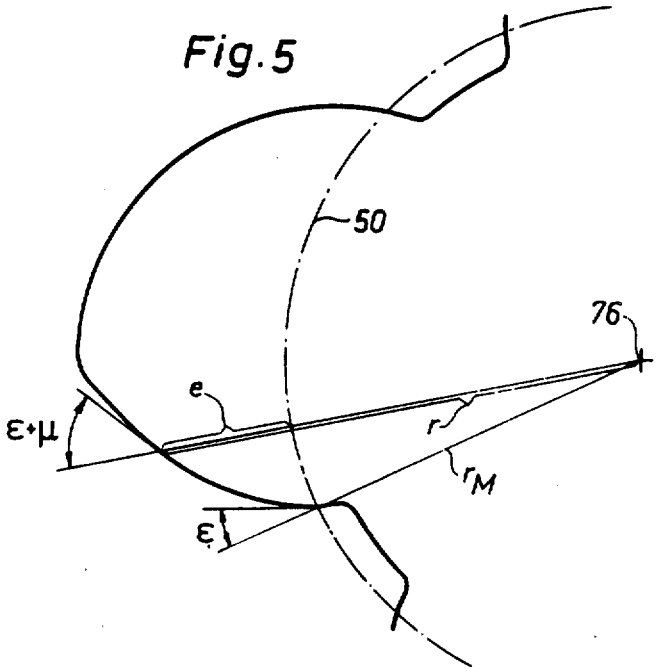
FIG. 5 shows a portion of the male rotor shown in FIG. 3.

A tangent to a male rotor flank at an arbitrary point thereof is shown in FIG. 5. The length of a radial line from the centre 76 of the rotor to this arbitrary point is denoted "r," and is comprised of the pitch radius "$r_M$" and a distance "e" from the pitch circle to said arbitrary point. The angle between this radial line and the tangent is denoted "$\mu+\epsilon$" when measured correspondingly to the angle "$\epsilon$" between the radial line and the tangent at the pitch point, i.e., the point where the flank and the pitch circle intersect (FIG. 3). The deviation of the tangent angle when the point of tangency moves from the pitch point along the flank is thus "$\mu$." This angle "$\mu$" is a function of the corresponding distance "e," and the ratio between said angle "$\mu$" and distance "$\mu/e$" is a specific characteristic of the shape of the rotor flank.

Figure 6:
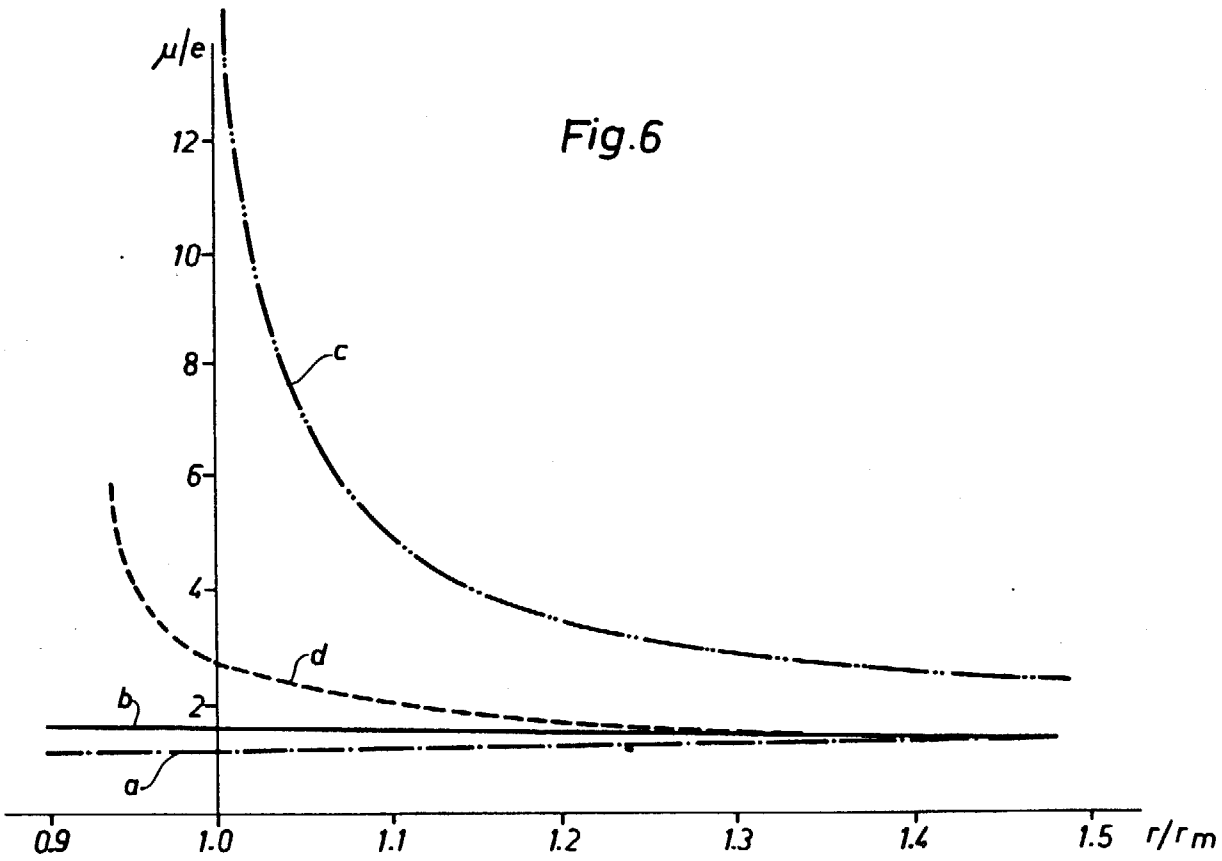
FIG. 6 shows in a diagram the shape of the male rotor flanks in relation to the rotor radius.

FIG. 6 shows in a diagram the variation of the ratio "$\mu/e$," specified above in connection with FIG. 5, as a function of the radial distance "$r/r_M$" from the centre 76 of the rotor to the actual point of tangency. The curve "a" relates to the secondary flank 64 in FIG. 3, the curve "b" relates to the primary flank 62 in FIG. 3, the curve "c" relates to the corresponding primary flank "116" of the rotor profile shown in FIG. 6 of British Pat. No. 1,197,432, and curve "d" shows as a comparison the function of a flank similar to that related to curve "c" where the flank portion adjacent to the pitch circle has been replaced by a flank portion of involute type having a pressure angle of 20°.

As clearly shown in this diagram the ratio "$\mu e$" for the type of primary flank used up to now, curve "c," follows a function of generally hyperbolic type having an asymptote at the pitch circle. In other words the angular deviation of the angle of the tangent varies very quickly from the radial position of the point of tangency within the region adjacent to the pitch circle. This means that a cutter for production of such a profile also will have a shape where the edge thereof gets a fast variation of its direction and of its radius of curvature which in turn results in very high requirements of the exactness of the cutter for production of a rotor having reasonable tolerances.

By replacing the root portion of the flank by an involute type flank portion a certain improvement is obtained. However, as shown in the diagram, curve "d," the ratio "$\mu/e$" follows a function of the same general type even though the most critical part is moved from the pitch circle to the base circle of the involute.

The primary flank 62 of the profile shown in FIG 3, however, results in quite another function for the ratio "$\mu/e$." As shown in the diagram, curve "b," the function approaches that of a straight line, especially within the region extending on both sides of the pitch circle. Futhermore the value of the function within this region amounts to about 1.6, is substantially constant and about equal to the average value of the ratio in points of tangency disposed on a larger distance from the centre of the rotor. According to the invention this value of the ratio "$\mu/e$" shall be chosen such that $$\mu/e = \frac{1 - c/\cos^2\epsilon}{\tan\epsilon}$$

where c is constant having a maximum value of about 0.4, a minimum value of about 0.1, and a preferred value of 0.2–0.3.

The secondary flank 64 of the profile shown in FIG. 3 results in a similar function for the ratio "$\mu e$". As shown in the diagram, curve "a" the function follows over the main portion of the flank inside as well as outside of the pitch circle a substantially straight line and has a practically constant value of about 1.1 which also falls within the range of the formula given above.

By shaping the flanks of each male rotor groove according to the invention the angular deviation of the angle of the tangent varies in proportion to the radial position of the point of tangency, especially within the region of the flank adjacent to the pitch circle and disposed on both sides thereof. This means that a cutter for production of such a profile will have a shape where the edge thereof follows a continuous curve without any fast changes of its direction or of its radius of curvature which in turn results in a very close tolerances of a rotor produced thereby compared with a rotor of the old type shown in FIG. 6 of British Pat. No. 1,197,432 with the same tolerances of the cutters. In other words the quality of the rotors and thereby the efficiency of the screw rotor machine in which they are mounted will be considerably increased without any increase of the manufacturing cost in fact this cost may even be decreased as the new cutter profile is easier and thus cheaper to produce.

Figure 7:
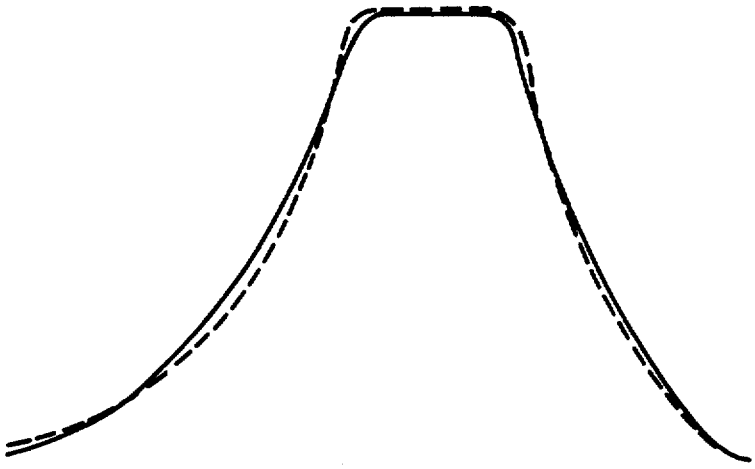
FIG. 7 shows the profile of a cutter blade.

This fact is further illustrated in FIG. 7 where the profile of a blade for a profile cutter according to the invention is shown by a continuous line together with the corresponding profile for the old profile discussed above shown by a dashed line. As clearly shown therein the angle between the two flanks of the cutter blade is much larger for the one according to the invention than for the one according to the old rotor profile. This fact is most dominant at the outer end of the blade where the angle between the flanks has its minimum. Thus the minimum angle of the new blade is about 48° which is about four times that of the old blade which is only about 12°. Consequently the number of possible resharpening operations of the new blade before it is cut down to its minimum size will be many times larger than that of the old blade as the amount of material to be ground away in each operation will be drastically reduced. The tooling cost can thus be cut down drastically which means a still more economical production of the screw rotor machines.

The shape of the blade profile further means more favourable cutting angles and less wear of the tools which means a higher number of rotors produced between the resharpening operations. Furthermore the new profile admits a wider selection of the angles between the cutting tool and the workpiece during the manufacturing operation which in turn means that the cutting angles will be still more favourable so that the wear of the tool is still more reduced simultaneously as it opens up the possibility to increase the cutting speed. In other worlds the invention opens up the possibility to manufacture a more efficient machine for a considerably lower cost than that for the old less efficient machine.

Although the discussions above are restricted to profile cutting processes the same advantages are available also for other cutting processes, such as hob milling and grinding. Similar or corresponding advantages will also be available if the rotors are produced by any other type of production including plastic deformation processes and casting.

It is further to be noted that the first male flank portion has such a radius of curvature that the surface stresses of the rotor flanks are minimized which in combination with a decreased relative sliding speed results in less wear of the rotors during operation of the screw rotor machine.

The fact that at least the primary flank of the male rotor extends inside the pitch circle allows that the contact area between the rotor flanks on this side may be arranged on this side of the pitch circle which results in a possibility to use a female rotor drive arrangement where the relative motion between the cooperating flanks is such that a lubricating oil film is positively built up between the contact surfaces.

By means of the present invention it is thus possible to produce a screw rotor machine with a higher efficiency, less wear thereof and a possibility to use female as well as male rotor drive. This machine will further independent of the type of manufacturing process be simpler and cheaper to produce than similar machines of earlier known types.

I claim:

1. Screw rotor machine for a working fluid comprising a casing with a working space provided with spaced apart low pressure and high pressure ports for communication with low pressure and high pressure channels, respectively, and including at least two intersecting bores with parallel axes, a number of rotors disposed in said bores and intermeshing in pairs, each rotor having helical lands and intervening grooves, whereby a pair of communicating groove portions form a chevron-shaped chamber having its base end disposed in a plane transverse to the axes of the rotors and adjacent to the high pressure port of the machine, one rotor of each pair being of female rotor type formed such that at least the major portion of each land and groove is located inside the pitch circle of the rotor, the other rotor of the pair being of male rotor type formed such that at least the major portion of each land and groove is located outside the pitch circle of the rotor, the lands of one rotor following the envelopes developed by the grooves of the other rotor to form a continuous sealing line between the rotors, each rotor groove being provided with a primary flank forming the peripherally outer wall of the leg of said chamber comprised of a female rotor groove and the peripherally inner wall of the leg of said chamber comprised of a male rotor groove, respectively, and a secondary flank forming the other wall of the related leg of the chamber, characterized in that in a plane perpendicular to the rotor axes at least the primary flank of each male rotor groove comprises a first flank portion adjacent to the pitch circle and extending outwardly therefrom, that the tangent to said first flank portion in its pitch point, where it intersects with the pitch circle, and a radial line from the centre of the rotor through the pitch point form an angle therebetween falling within the range of 0.25 rad to 0.75 rad, when measured outside the pitch circle from the tangent towards the groove, and that the radius of curvature of said first flank portion in its pitch point has a length exceeding the product of the pitch radius and the sine function of said pitch point angle between the tangent and the radial line.

2. Machine as defined in claim 1, in which said first flank portion extends inside the pitch circle.

3. Machine as defined in claim 1 or 2, in which said first flank portion is convexly curved.

4. Machine as defined in claim 3, in which said first flank portion has such a shape that the ratio between the angular deviation from said pitch point angle of the angle between the tangent to the first flank portion at an arbitrary point thereof and a radial line therethrough, and the radial distance from said arbitrary point to the pitch circle, is substantially constant and about equal to the average value of said ratio at points of the major flank portion disposed outside said first flank portion.

5. Machine as defined in claim 4, in which said ratio varies in accordance with the formula $$\frac{\mu}{e} = \frac{1 - C/\cos^2\epsilon}{\tan\epsilon}$$

where $\mu$ is the angular deviation in rad, e is the radial distance from the actual point to the pitch circle in proportion to the pitch radius, $\epsilon$ is the pitch point angle, and C is a constant having a maximum value of about 0.4, a minimum value of 0.1, and a preferred value of 0.2 to 0.3.

6. Machine as defined in claim 2, in which the radial extremes of said first flank portion lie within the range 0.9 to 1.15 times the pitch radius.

7. Machine as defined in claim 3, in which said first flank portion has an approximately constant radius of curvature.

8. Machine as defined in claim 7, in which said first flank portion follows a curve of the second degree.

9. Machine as defined in claim 9, in which said curve is a circular arc having a radius of from 1.1 to 1.7 times the product of the pitch radius and the sine function of said pitch angle and its centre disposed at a distance from the centre of the rotor such that the ratio between said distance and the pitch radius falls between the cosine function of the pitch angle and the square root of said function.

10. Machine as defined in claim 3, in which said pitch point angle is about 0.3 rad.

11. Machine as defined in claim 1, in which said primary male rotor flank comprises a second flank portion adjacent to and extending radially outwardly from said first portion of the flank, the radius of curvature of said second portion at the point common for said flank portions being of at least the same length as that of the first flank portion in said point.

12. Machine as defined in claim 11, in which said second flank portion is of a generally epitrochoidal shape generated by a flank section of the cooperating female rotor flank disposed inside the pitch circle of the female rotor.

13. Machine as defined in claim 12, in which said flank section follows a curve having at least for its outermost point a centre of curvature disposed inside the pitch circle of the rotor and a radius of curvature being a small fraction of the pitch radius of the rotor.

14. Machine as defined in claim 13, in which said flank section follows a circular arc having a radius, the length of which is less than 10% of the distance between the centres of the rotors and its centre disposed at a distance from the centre of the rotor, such that the ratio between said distance and the pitch radius of the female rotor is about equal to the square root of the cosine function of said pitch point angle.

15. Machine as defined in claim 13 or 14, in which said flank section in each end point thereof has a tangent common to that of the consecutive flank portion at the same point.

16. Machines as defined in claim 12, in which said primary male rotor flank comprises a third portion adjacent to said second portion and extending radially outwardly therefrom to the crest of the related land, said third portion following a convex curve having at any point thereof a short radius of curvature and a centre of curvature disposed outside the pitch circle of the motor.

17. Machine as defined in claim 16, in which said curve defining the third flank portion is of the second degree.

18. Machine as defined in claim 17, in which said second degree curve is a circular arc having a radius the length of which is less than 15% of the distance between the centres of the rotors.

19. Machine as defined in claim 16, in which said third flank portion at its radially innermost point has a tangent common to that of the second flank portion at the same point.

20. Machine as defined in claim 1, in which the secondary flank of each male rotor groove comprises a first flank portion similar to that of the primary flank.

21. Machine as defined in claim 20, in which said firt flank portion of the secondary flank extends out to a crest portion of the land.

22. Machine as defined in claim 20 or 21, in which the pitch point angle of the secondary flank is about 0.5 rad.

23. Machine as defined in claim 1, in which the crest portion of each male rotor land follows a circular arc having its centre on the pitch circle and having a tangent at each end thereof common to that of the adjoining portion at the same point.

24. Machine as defined in claim 1, in which the bottom portion of each male rotor groove comprises a radially innermost section and at least one concave section joining said innermost section with the adjacent flank portion, said concave section following a circular arc having a radius which is a small fraction of the pitch radius and having a tangent at each end point thereof common to that of the adjacent rotor profile portion at the same point.

25. Machine as defined in claim 9, in which said radius of said circular arc of said curve is about 1.5 times the product of the pitch radius and said sine function.

26. Machine as defined in claim 14, wherein said flank section follows a circular arc having a radius of about 5% of the distance between the centers of the rotors.

27. Machine as defined in claim 18, wherein said radius of said circular arc of said second-degree curve has a length of about 5% of the distance between the centers of the rotors.

28. A pair of intermeshing rotors having helical lands and intervening grooves and adapted for rotation about parallel axes within a working space of a screw rotor machine, one rotor of each pair being of female rotor type formed such that at least the major portion of each land and groove is located inside the pitch circle of the rotor, the other rotor of the pair being of male rotor type formed such that at least the major portion of each land and groove is located outside the pitch circle of the rotor, the lands of one rotor following the envelopes developed by the grooves of the other rotor to form a continuous sealing line between the rotors, each rotor groove being provided with a primary flank forming the peripherally outer wall of the leg of said chamber comprised of a female rotor groove and the peripherally inner wall of the leg of said chamber comprised of a male rotor groove, respectively, and a secondary flank forming the other wall of the related leg of the chamber, characterized in that in a plane perpendicular to the rotor axes at least the primary flank of each male motor groove compriss a first flank portion adjacent to the pitch circle and extending outwardly therefrom, that the tangent to said first flank portion in its pitch point, where it intersects with the pitch circle, and a radial line from the centre of the rotor through the pitch point form an angle therebetween falling within the range 0.25 rad to 0.75 rad, when measured outside the pitch circle from the tangent towards the groove, and that the radius of curvature of said first flank portion in its pitch point has a length exceeding the product of the pitch radius and the sine function of said pitch point angle between the tangent and the radial line.

29. A pair of intermeshing rotors as defined in claim 28, in which said first flank portion extends inside the pitch circle.

30. A pair of intermeshing rotors as defined in claim 28 or 29, in which said first flank portion is convexly curved.

31. A pair of intermeshing rotors as defined in claim 30, in which said first flank portion has such a shape that the ratio between the angular deviation from said pitch point angle of the angle between the tangent to the first flank portion at an arbitrary point thereof and a radial line therethrough, and the radial distance from said arbitrary point to the pitch circle, is substantially constant and about equal to the average value of said ratio at points of the major flank portion disposed outside said first flank portion.

32. A pair of intermeshing rotors as defined in claim 31, in which said ratio varies in accordance with the formula $$\frac{\mu}{e} = \frac{1 - C/\cos^2\epsilon}{\tan\epsilon}$$

where $\mu$ is the angular deviation in rad.

e is the radial distance from the actual point to the pitch circle in proportion to the pitch radius, $\epsilon$ is the pitch point angle, and C is a constant having a maximum value of about 0.4, a minimum value of 0.1, and a preferred value of 0.2 to 0.3.

33. A pair of intermeshing rotors as defined in claim 29, in which the radial extremes of said first flank portion lie within the range 0.9 to 1.15 times the pitch radius.

34. A pair of intermeshing rotors as defined in claim 30, in which said first flank portion has an approximately constant radius of curvature.

35. A pair of intermeshing rotors as defined in claim 34, in which said first flank portion follows a curve of the second degree.

36. A pair of intermeshing rotors as defined in claim 35, in which said curve is a circular arc having a radius of from 1.1 to 1.7 times the product of the pitch radius and the sine function of said pitch point angle and its centre disposed at a distance from the centre of the rotor such that the ratio between said distance and the pitch radius falls between the cosine function of the pitch angle and the square root of said function.

37. A pair of intermeshing rotors as defined in claim 30, in which said pitch point angle is about 0.3 rad.

38. A pair of intermeshing rotors as defined in claim 28, in which said primary male rotor flank comprises a second flank portion adjacent to and extending radially outwardly from said first portion of the flank, the radius of curvature of said second portion at the point common for said flank portions being of at least the same length as that of the first flank portion in said point.

39. A pair of intermeshing rotors as defined in claim 38, in which said second flank portion is of a generally epitrochoidal shape generated by a flank section of the cooperating female rotor flank disposed inside the pitch circle of the female rotor.

40. A pair of intermeshing rotors as defined in claim 39, in which said flank section follows a curve having at least for its outermost point a centre of curvature disposed inside the pitch circle of the rotor and a radius of curvature being a small fraction of the pitch radius of the rotor.

41. A pair of intermeshing rotors as defined in claim 40, in which said flank section follows a circular arc having a radius, the length of which is less than 10% of the distance between the centres of the rotors and its centre disposed at a distance from the centre of the rotor, such that the ratio between said distance and the pitch radius of the female rotor is about equal to the square root of the cosine function of said pitch point angle.

42. A pair of intermeshing rotors as defined in claim 40 or 41, in which said flank section in each end point thereof has a tangent common to that of the consecutive flank portion at the same point.

43. A pair of intermeshing rotors as defined in claim 39, in which said primary male rotor flank comprises a third portion adjacent to said second portion and extending radially outwardly therefrom to the crest of the related land, said third portion following a convex curve having at any point thereof a short radius of curvature and a centre of curvature disposed outside the pitch circle of the rotor.

44. A pair of intermeshing rotors as defined in claim 43, in which said curve defining the third flank portion is of the second degree.

45. A pair of intermeshing rotors as defined in claim 44, in which said second degree curve is a circular arc having a radius the length of which is less than 15% of the distance between the centres of the rotors.

46. A pair of intermeshing rotors as defined in claim 43, in which said third flank portion at its radially innermost point has a tangent common to that of the second flank portion at the same point.

47. A pair of intermeshing rotors as defined in claim 28, in which the secondary flank of each male rotor groove comprises a first flank portion similar to that of the primary flank.

48. A pair of intermeshing rotors as defined in claim 47, in which said first flank portion of the secondary flank extends out to a crest portion of the land.

49. A pair of intermeshing rotors as defined in claim 47 or 48, in which the pitch point angle of the secondary flask is about 0.5 rad.

50. A pair of intermeshing rotors as defined in claim 28, in which the crest portion of each male rotor land follows a circular arc having its centre on the pitch circle and having a tangent at each end thereof common to that of the adjoining flank portion at the same point.

51. A pair of intermeshing rotors as defined in claim 28, in which the bottom portion of each male rotor groove comprises a radially innermost section and at least one concave section joining said innermost section with the adjacent flank portion, said concave section following a circular arc having a radius which is a small fraction of the pitch radius and having a tangent at each end thereof common to that of the adjacent rotor profile portion at the same point.

*52. A pair of intermeshing rotors having helical lands and intervening grooves and adapted for rotation about parallel axes within a working space of a screw rotor machine, one rotor of each pair being of female rotor type formed such that at least the major portion of each land and groove is located inside the pitch circle of the rotor, the other rotor of the pair being of male rotor type formed such that at least the major portion of each land and groove is located outside the pitch circle of the rotor, the lands of one rotor following the envelopes developed by the grooves of the other rotor to form a continuous sealing line between the rotors, each rotor groove being provided with a primary flank forming the peripherally outer wall of the leg of said chamber comprised of a female rotor groove and the peripherally inner wall of the leg of said chamber comprised of a male rotor groove, respectively, and a secondary flank forming the other wall of the related leg of the chamber, characterized in that in a plane perpendicular to the rotor axes the primary flank of each male rotor groove comprises a first flank portion following a circular arc the radial extremes of which lie within the range 0.9 to 1.15 times the pitch radius.*

*53. A pair of intermeshing rotors as defined in claim 52 in which the primary flank of each male rotor groove comprises a second flank portion adjacent to and extending radially outwardly from said first flank portion, and the radius of curvature of said second flank portion at the point common for said first and second flank portions being of at least the same length as that of the first flank portion in said point.*

*54. A pair of intermeshing rotors as defined in claim 53, in which said second flank portion follows a curve of a generally epitrochoidal shape generated by a rounded flank*

*section of the cooperating female rotor flank disposed inside the pitch circle of the female rotor.*

*55. A pair of intermeshing rotors as defined in claim 54, in which the radius of curvature of said generally epitrochoidal curve defining the second flank portion decreases continuously from the outer point thereof to the inner point thereof where it has a functional miniumum.*

*56. Screw rotor machine for a working fluid comprising a casing with a working space provided with spaced apart low pressure and high pressure ports for communication with low pressure and high pressure channels, respectively, and including at least two intersecting bores with parallel axes, a number of rotors disposed in said bores and intermeshing in pairs, each rotor having helical lands and intervening grooves, whereby a pair of communicating groove portions form a chevron-shaped chamber having its base end disposed in a plane transverse to the axes of the rotors and adjacent to the high pressure port of the machine, one rotor of each pair being of female rotor type formed such that at least the major portion of each land and groove is located inside the pitch circle of the rotor, the other rotor of the pair being of the male rotor type formed such that at least the major portion of each land and groove is located outside the pitch circle of the rotor, the lands of one rotor following the envelopes developed by the grooves of the other rotor to form a continuous sealing line between the rotors, each rotor groove being provided with a primary flank forming the peripherally outer wall of the leg of said chamber comprised of a female rotor groove and the peripherally inner wall of the leg of said chamber comprised of a male rotor groove, respectively, and a secondary flank forming the other wall of the related leg of the chamber, characterized in that in a plane perpendicular to the rotor axes the primary flank of each male rotor groove comprises a first flank portion following a circular arc the radial extremes of which lie within the range 0.9 to 1.15 times the pitch radius.*

*57. Machine as defined in claim 56 in which the primary flank of each male rotor groove comprises a second flank portion adjacent to and extending radially outwardly from said first flank portion, and the radius of curvature of said second flank portion at the point common for said first and second flank portions being of at least the same length as that of the first flank portion in said point.*

*58. Machine as defined in claim 57, in which said second flank portion follows a curve of a generally epitrochoidal shape generated by a rounded flank section of the cooperating female rotor flank disposed inside the pitch circle of the female rotor.*

*59. Machine as defined in claim 58, in which the radius of curvature of said generally epitrochoidal curve defining the second flank portion decreases continuously from the outer point thereof to the inner point thereof where it has a functional minimum.*

*60. Screw rotor machine for a working fluid comprising a casing with a working space provided with spaced apart low pressure and high pressure ports for communication with low pressure and high pressure channels, respectively, and including at least two intersecting bores with parallel axes, a number of rotors disposed in said bores and intermeshing in pairs, each rotor having helical lands and intervening grooves, whereby a pair of communicating groove portions form a chevron-shaped chamber having its base end disposed in a plane transverse to the axes of the rotors and adjacent to the high pressure port of the machine, one rotor of each pair being of female rotor type formed such that at least the major portion of each land and groove is located inside the pitch circle of the rotor, the other rotor of the pair being of male rotor type formed such that at least the major portion of each land and groove is located outside the pitch circle of the rotor, the lands of one rotor following the envelopes developed by the grooves of the other rotor to form a continuous sealing line between the rotors, each rotor groove being provided with a primary flank forming the peripherally outer wall of the leg of said chamber comprised of a female rotor groove and the peripherally inner wall of the leg of said chamber comprised of a male rotor groove, respectively, and a secondary flank forming the other wall of the related leg of the chamber, characterized in that in a plane perpendicular to the rotor axes the primary flank of each male rotor groove comprises a first flank portion, following a circular arc, and a second flank portion adjacent to and extending radially outwardly from said first flank portion, said second flank portion following a curve of generally epitrochoidal shape generated by a flank section of the cooperating female rotor flank disposed inside the pitch circle of the female rotor, the radius of curvature of said curve defining the second flank portion decreases continuously from the outer point thereof to the inner point thereof, that the radius of curvature of said second flank portion at the point common for said flank portions is of at least the same length as that of the first flank portion in said point, and that a first flank portion of the primary flank of each female rotor groove extending from a crest portion to said flank section follows a curve generated by the first flank portion of the cooperating primary flank of the male rotor.*

*61. A pair of intermeshing rotors having helical lands and intervening grooves and adapted for rotation about parallel axes within a working space of a screw rotor machine, one rotor of each pair being of female rotor type formed such that at least the major portion of each land and groove is located inside the pitch circle of the rotor, the other rotor of the pair being of male rotor type formed such that at least the major portion of each land and groove is located outside the pitch circle of the rotor, the lands of one rotor following the envelopes developed by the grooves of the other rotor to form a continuous sealing line between the rotors, each rotor groove being provided with a primary flank forming the peripherally outer wall of the leg of said chamber comprised of a female rotor groove and the peripherally inner wall of the leg of said chamber comprised of a male rotor groove, respectively, and a secondary flank forming the other wall of the related leg of the chamber, characterized in that in a plane perpendicular to the rotor axes the primary flank of each male rotor groove comprises a first flank portion, following a circular arc, and a second flank portion adjacent to and extending radially outwardly from said first flank portion, said second flank portion following a curve of generally epitrochoidal shape generated by a flank section of the cooperating female rotor flank disposed inside the pitch circle of the female rotor, the radius of curvature of said curve defining the second flank portion decreases continuously from the outer point thereof to the inner point thereof, that the radius of curvature of said second flank portion at the point common for said flank portions is of at least the same length as that of the first flank portion in said point, and that a first flank portion of the primary flank of each female rotor groove extending from a crest portion to said flank section follows a curve generated by the first flank portion of the cooperating primary flank of the male rotor.*

* * * * *